United States Patent
Hou et al.

(10) Patent No.: US 7,042,859 B2
(45) Date of Patent: May 9, 2006

(54) METHODS AND SYSTEMS FOR PERFORMING CALL HANDOVER IN A MEDIA GATEWAY

(75) Inventors: Hao Hou, Plano, TX (US); Yong He, Plano, TX (US); Tuan Minh Nguyen, Arlington, TX (US); Ahmed Doleh, Plano, TX (US)

(73) Assignee: Santera Systems, Inc., Plano, TX (US)

( * ) Notice: Subject to any disclaimer, the term of this patent is extended or adjusted under 35 U.S.C. 154(b) by 225 days.

(21) Appl. No.: 10/653,674

(22) Filed: Sep. 2, 2003

(65) Prior Publication Data

US 2005/0048973 A1    Mar. 3, 2005

(51) Int. Cl.
  *H04Q 7/00* (2006.01)
  *H04Q 7/20* (2006.01)
  *H04L 12/28* (2006.01)
  *H04L 12/56* (2006.01)

(52) U.S. Cl. .................. 370/331; 370/401; 455/436
(58) Field of Classification Search ................ 370/331, 370/401, 338, 328; 455/436–444
  See application file for complete search history.

(56) References Cited

U.S. PATENT DOCUMENTS

| 6,765,931 | B1* | 7/2004 | Rabenko et al. ............ 370/493 |
| 6,870,905 | B1 | 3/2005 | Pelaez et al. |
| 2002/0051518 | A1 | 5/2002 | Bondy et al. |
| 2003/0174695 | A1 | 9/2003 | Lautenschlager et al. |
| 2004/0157629 | A1 | 8/2004 | Kallio et al. |
| 2004/0165709 | A1 | 8/2004 | Pence et al. |
| 2004/0192294 | A1* | 9/2004 | Pan et al. ................. 455/432.1 |
| 2004/0228336 | A1* | 11/2004 | Kung et al. ................. 370/352 |
| 2004/0228362 | A1 | 11/2004 | Maki et al. |
| 2004/0235477 | A1* | 11/2004 | Picha et al. ................. 455/439 |
| 2005/0076117 | A1 | 4/2005 | Hou et al. |

OTHER PUBLICATIONS

Cuervo et al., "Megaco Protocol Version 1.0," Network Working Group, http://www.ietf.org/rfc/rfc301.5.txt?number=3015, pp. 1-78 (Nov. 2000).

* cited by examiner

*Primary Examiner*—Chi Pham
*Assistant Examiner*—Ronald Abelson
(74) *Attorney, Agent, or Firm*—Jenkins, Wilson, Taylor & Hunt, P.A.

(57) ABSTRACT

Methods and systems for controlling media stream handover in a media gateway includes establishing a call context between a first termination and a second termination in a media gateway. The first and second terminations are capable of bi-directional media stream communications associated with a call between first and second end users. In response to a handover event affecting the first termination, a third termination is added to the context. The third termination is initially capable of receive-only communications. The context is then modified such that the third termination becomes capable of bi-directional media stream communications and the first termination becomes capable of receive-only communications. The first termination is then removed from the context. The media stream handover may be performed using extensions to a media gateway control protocol and without using a conference bridge.

40 Claims, 10 Drawing Sheets ature. In one exemplary implementation, the method includes creating a termination pair within the media gateway. The termination pair has a first termination configured as a primary termination and a second termination configured as a secondary termination. As used herein, a primary termination refers to a bi-directional termination involved in a handover. A secondary termination refers to a receive-only termination involved in a handover. A normal termination refers to a bi-directional termination that is not involved in a handover. In the termination pair, the configurations of the first termination and second termination are modified such that the first termination is configured as the secondary termination and the second termination is configured as the primary. The first termination may be removed.

METHODS AND SYSTEMS FOR PERFORMING CALL HANDOVER IN A MEDIA GATEWAY

TECHNICAL FIELD

The present invention relates to methods and systems for performing call handover. More particularly, the present invention relates to methods and systems for controlling call handover functionality in a media gateway.

BACKGROUND ART

In mobile communications networks, a handover refers to the switching from one communications channel to another communications channel during the progress of a call. Such switching may occur, for example, when a mobile subscriber moves out of range of one base station and into the range of another base station. Handover can also occur when a subscriber moves between antennas in the same base station.

In packet-based mobile communications networks, handovers must be performed not only on the radio interface, but also on the media gateway or gateways associated with the base stations involved in the handover. A media gateway is a network entity that switches media stream communications between its input and output ports and may translate the media stream from one format to another format. Media gateways do not participate in call signaling and consequently do not maintain call state information. A media gateway controller performs signaling functions to establish and tear down calls across media gateways. Thus, performing a handover in a media gateway can include sending commands to the media gateway from one communications channel to another communications channel and freeing resources used by the old channel.

The MEGACO protocol, as described in ITU-T Recommendation H.248, includes commands for establishing contexts in a media gateway. A context is analogous to a call or a communications session between one or more parties. In a media gateway, a context is defined by its endpoints, referred to as terminations. Typically, a context has two terminations in the media gateway—one for communications to and from one party and one for communications to and from another party.

One problem with providing handover support in some existing media gateways is that these media gateways utilize conference bridges to provide handover support. The conference bridge is used to establish the new communications channel to receive the call when the handover is performed. The new communications channel and the old communications channel exist simultaneously in the conference bridge. When a handover occurs, the conference bridge switches the call to the new communications channel and frees resources associated with the old communications channel. While using a conference bridge provides one solution for performing handover in a media gateway, conference bridges are expensive and are not scalable to meet increasing network demands.

Accordingly, in light of these difficulties associated with conventional media gateways and media gateway control protocols, there exists a need for improved methods and systems for providing handover support in a media gateway.

SUMMARY OF THE INVENTION

According to one aspect, the present invention includes methods and systems for performing handover in a media gateway. In one exemplary implementation, the method includes creating a termination pair within the media gateway. The termination pair has a first termination configured as a primary termination and a second termination configured as a secondary termination. As used herein, a primary termination refers to a bi-directional termination involved in a handover. A secondary termination refers to a receive-only termination involved in a handover. A normal termination refers to a bi-directional termination that is not involved in a handover. In the termination pair, the configurations of the first termination and second termination are modified such that the first termination is configured as the secondary termination and the second termination is configured as the primary. The first termination may be removed.

The pairing of terminations and the switching of states of the various terminations involved in the termination may be accomplished using extensions to one of the standard media gateway control protocols. The extensions may include commands that allow terminations to be paired with other terminations and commands that allow the state of a termination to be changed. Using these commands, a media gateway controller can easily control one or more media gateways to perform a media stream handover without using a conference bridge.

Accordingly, it is an object of the invention to provide improved methods and systems for providing handover support in a media gateway.

It is another object of the invention to provide methods and systems for providing handover support in a media gateway without requiring a conference bridge.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
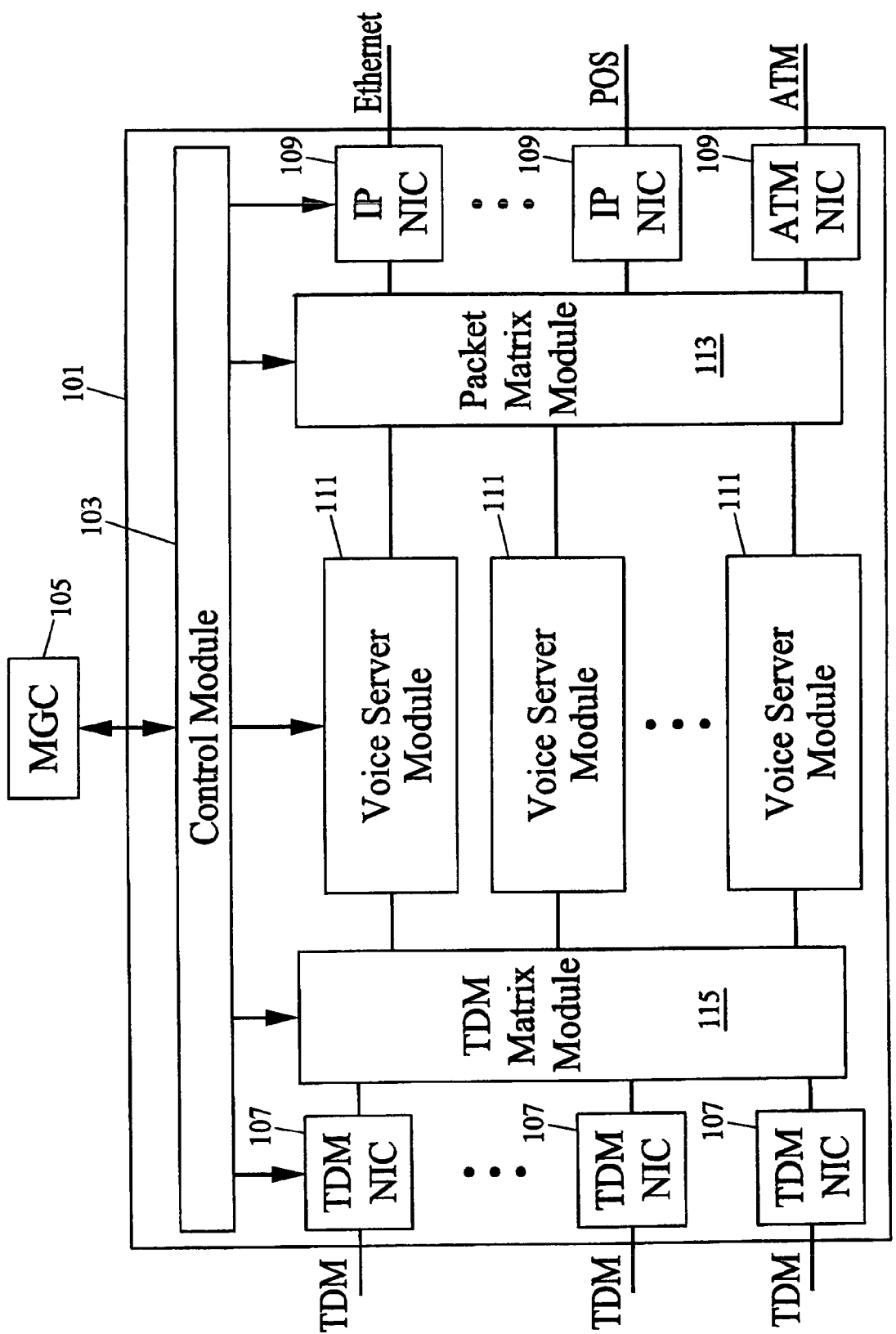
FIG. 1 is a block diagram of a media gateway that may be used to implement an embodiment of the invention.

FIG. 1 is a block diagram of a media gateway 101 that may be used to implement an embodiment of the invention. The media gateway 101 includes a control module 103 that functions as the command interface for a media gateway controller 105. Commands from the media gateway controller 105 are received and processed by the control module 103. The control module 103 may, in turn, provide instructions to or acquire information from other modules within the media gateway 101 in order to comply with the commands from the media gateway controller 105. According to the present invention, the media gateway controller 105 may send commands to the controller 103 to effect handovers and termination pairings in accordance with the present invention. Exemplary commands and handover scenarios will be described in detail below.

The media gateway 101 may also include interfaces for sending and receiving media streams to and from a plurality of different types of networks. For example, the media gateway 101 may also include time division multiplexed (TDM) network interface cards 107. TDM network interface cards 107 send and receive media streams from external TDM networks. TDM network interface cards 107 may implement any suitable physical layer protocol for sending and receiving media streams over TDM links. For example, each TDM NIC 107 may terminate one or more TDM voice trunks.

In addition to TDM network interface cards, the media gateway 101 may include packet network interface cards 109. Each packet network interface card 109 may implement network layer functions and packet forwarding functions, including Internet protocol (IP) forwarding functions. In the illustrated example, different packet network interface cards are provided to connect to external Ethernet, Packet Over SONET (POS), and asynchronous transfer mode (ATM) networks.

In FIG. 1, the media gateway 101 includes voice server modules 111, which may include circuitry for implementing one or more voice over packet protocols, such as RTP. In order to switch packets from network interface cards 109 to the appropriate voice server module 111, the media gateway 101 includes a packet matrix module 113. The packet matrix module 113 switches packets under the control of the control module 103. In addition to packet matrix module 113, media gateway 101 includes a TDM matrix module 115 for switching data in TDM time slots between TDM NICs 107 and voice server modules 111. TDM matrix modules 115 are also controlled by control module 103.

Different handover scenarios involving one or more media gateways will be described below. In the handover scenarios, the media gateways may be similar in structure to media gateway 101 illustrated in FIG. 1. However, the present invention is not limited to performing the handover routines described herein using a media gateway structure identical to that illustrated in FIG. 1. Any suitable media gateway capable of receiving commands from an internal or external media gateway controller and establishing call contexts based on the commands is intended to be within the scope of the invention.

Figure 2A:
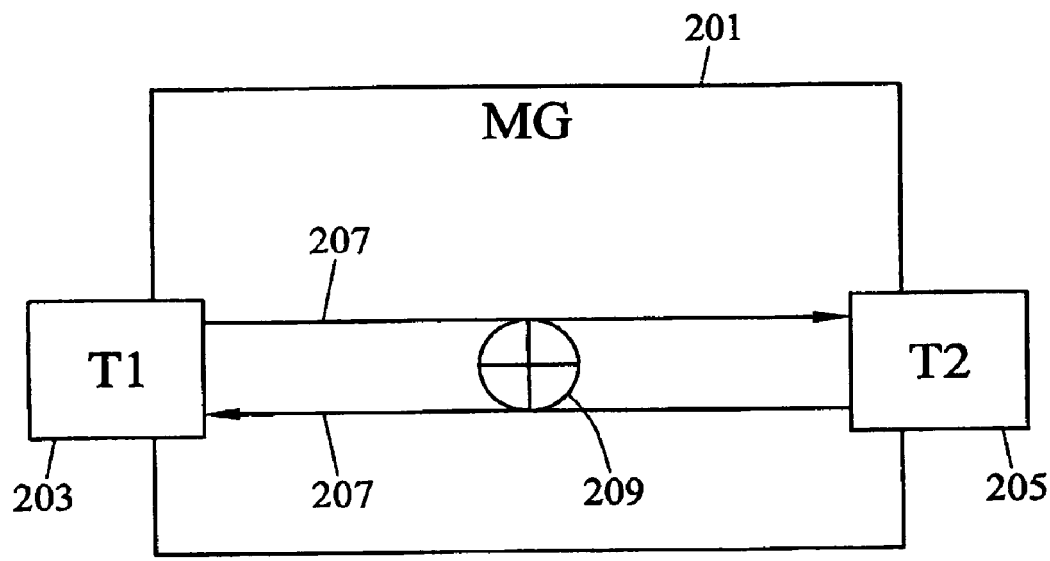
FIGS. 2A–2D are a sequence of block diagrams of a media gateway before, during, and after a call handover in accordance with the invention has been performed.

FIGS. 2A–2D are a sequence of block diagrams of a media gateway before, during, and after a handover sequence in accordance with the invention has been executed. FIG. 2A shows a media gateway 201 before handover is initiated. The media gateway 201 includes a first termination 203 and a second termination 205. Although FIG. 2A shows only two terminations, this is a simplification. One skilled in the art would recognize that a media gateway could have numerous terminations. A context 207 is established between the first and second terminations 203,205, and permits bi-directional media stream to flow between the terminations. A switching matrix 209 completes the interconnection of the terminations 203, 205 and is considered part of the context.

Figure 2B:
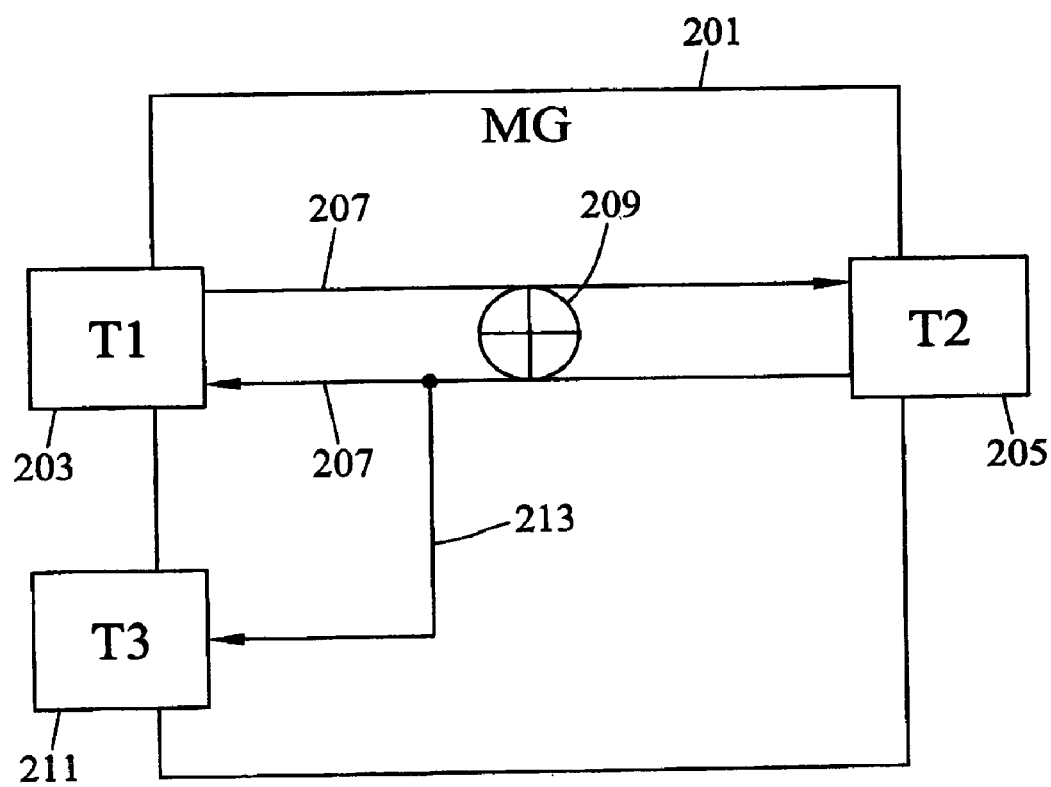

As shown in FIG. 2B, when the handover procedure is initiated, a third termination 211 is added to the existing context and is paired with the first termination 203. The concept of termination pairing is novel to the invention. One feature of termination pairing is that a termination is created and paired with one termination of an existing context. Another feature of termination pairing is the nature of the communication link to each termination. One of the paired terminations, called the primary termination, maintains a bi-directional link with the unpaired (or normal) termination. The other paired termination, called the secondary termination, maintains a unidirectional, receive-only connection 213 with the normal termination. For example, in FIG. 2B, the first termination 203 is the primary termination, the third termination 211 is the secondary termination, and the second termination 205 is the normal termination. It should be appreciated that end-user communication through the media gateway 201 is carried by the first termination 203 and the second termination 205 (i.e., the primary termination and the normal termination, respectively), since this is the only bidirectional path through the media gateway 201.

Figure 2C:
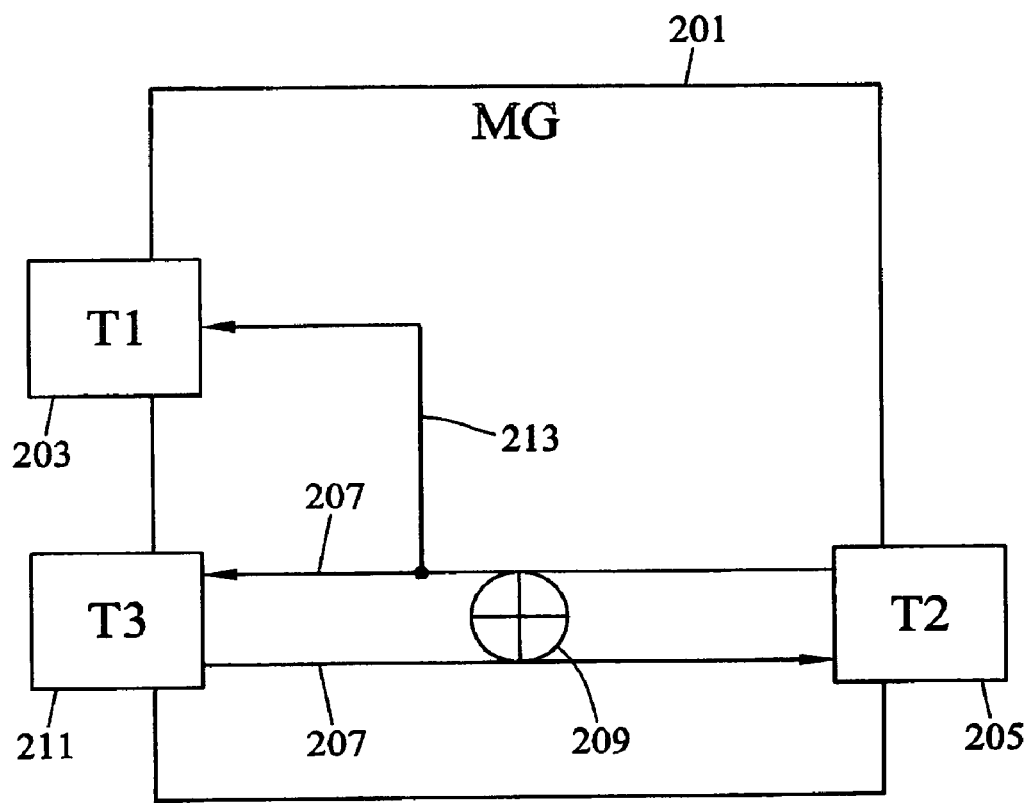
Figure 2D:
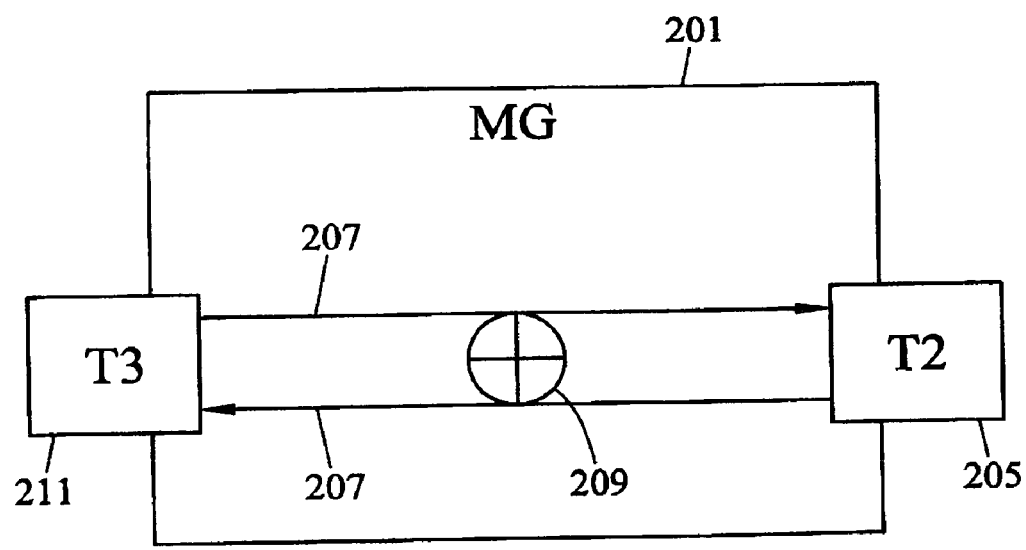

The handover procedure is completed by modifying the context to make the third termination 211 the primary termination and the first termination 203 the secondary termination, as shown in FIG. 2C. The bidirectional communication path through the media gateway 201 is now between the second termination 205 and the third termination 211, while the unidirectional, receive-only path is to the first termination 203. Thus, end-user communication through the media gateway 201 is carried between the third termination 211 and the second termination 205. Since the first termination 203 is no longer needed, it is desirable to free-up resources by removing the first termination from the context, as shown in FIG. 2D.

Figure 3:
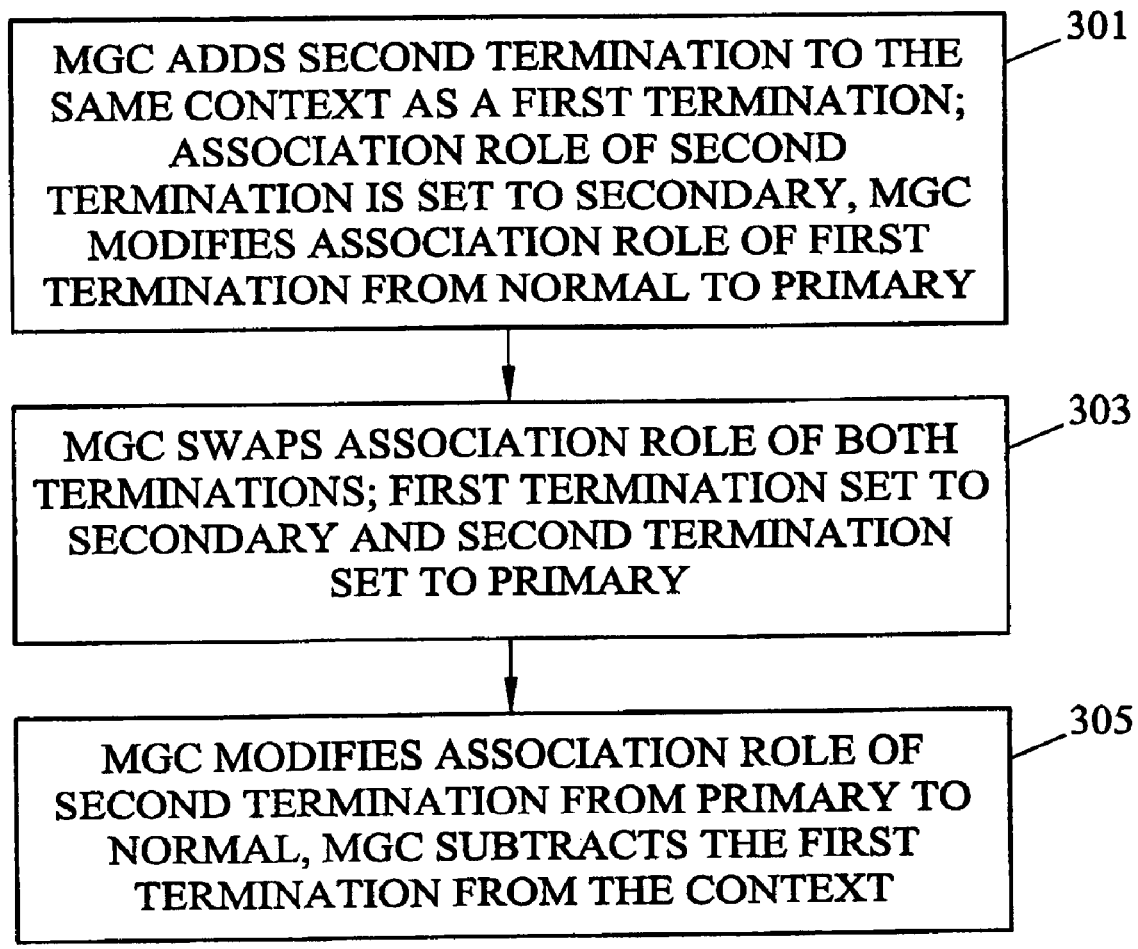
FIG. 3 is a flow chart of a call handover sequence in accordance with the invention.

FIG. 3 is a flow chart of a call handover procedure in accordance with the invention. A media gateway controller sending appropriate messages to one or more media gateways may perform the steps involved in the handover procedure. The handover procedure may be performed after other call set-up messages and normally during the conversation phase of a call. Various techniques known to the art may be used to determine whether the handover procedure should be initiated.

In step 301, the media gateway controller (MGC) adds a second termination to the same context as a first termination. The association role of the second termination is set to secondary. The MGC also modifies the association role of the first termination from normal to primary. In step 303, the MGC swaps the association role of both terminations. That is, the first termination is set to secondary and the second termination is set to primary. In step 305, the MGC modifies the association role of the second termination from primary to normal, and subtracts the first termination from the context.

Figure 4:
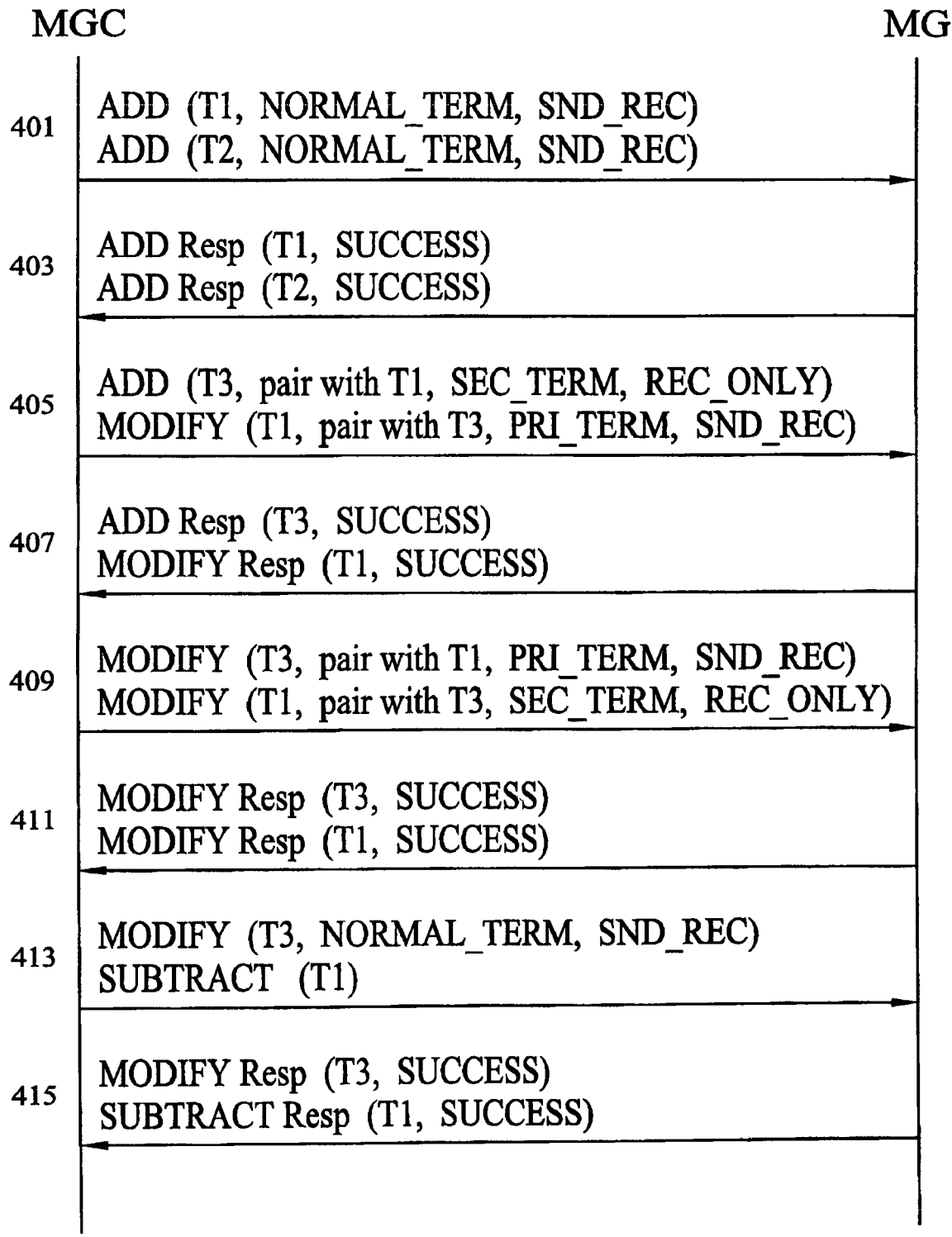
FIG. 4 is a signaling diagram of commands that may be used to implement an embodiment of the method for controlling handover in a media gateway in accordance with the invention.

It should be appreciated that the steps performed by the MGC may take the form of instructions from the MGC to the MG. The MG may respond to the instructions, for example, by acknowledging the receipt of the instruction or signaling whether or not the instruction has been successfully executed. FIG. 4 is a signaling diagram of commands that may be used to implement an embodiment of the method for controlling handover in a media gateway in accordance with the invention. The diagram shows messages from the MGC to the MG and return messages from the MG to the MGC. It should be noted that the internal architecture of the MG may provide for various subsystems or modules and that a command received from the MGC may result in one or more messages between subsystems to perform the requested task.

In step 401, the MGC instructs the MG to add terminations T1 and T2. Both terminations are configured as normal terminations with send and receive capability. The terms "send" and "receive", as used herein, refer to sending and receiving information between terminations within a media gateway. In the MEGACO protocol specification, the terms "send" and "receive" refer to transfer of information to and from outside of a media gateway by a termination in the media gateway respectively. The MG responds in step 403 that each command was successfully executed. Steps 401 and 403 may be performed as part of the initial call set-up.

At some point in during the call, the MGC determines that a handover is needed. In step 405, the MGC instructs the MG to add termination T3 and pair it with termination T1. Termination T3 is configured as a secondary termination with receive-only capability. The MGC also instructs the MG to modify the configuration of termination T1 by configuring it as a primary termination and pairing it with termination T3. In step 407, the MG responds to the add and modify commands. In step 409, the MGC instructs the MG to modify the configuration of termination T3 to make it a primary termination with send and receive capability. The MGC also instructs the MG to modify the configuration of termination T1 to make it a secondary termination with receive-only capability. In step 411, the MG responds to the modify commands. In step 413, the MGC instructs the MG to modify the configuration of termination T3 to make it a normal termination and to subtract termination T1. The MG responds to the modify and subtract commands in step 415.

The following examples of handover scenarios are provided to enhance the understanding of the invention as it is applied to various situations and should not be used to limit the scope of the claimed invention. It will be understood that in the following examples, media gateways, terminations, and call contexts are general perform as described above.

EXAMPLE 1

Figure 5:
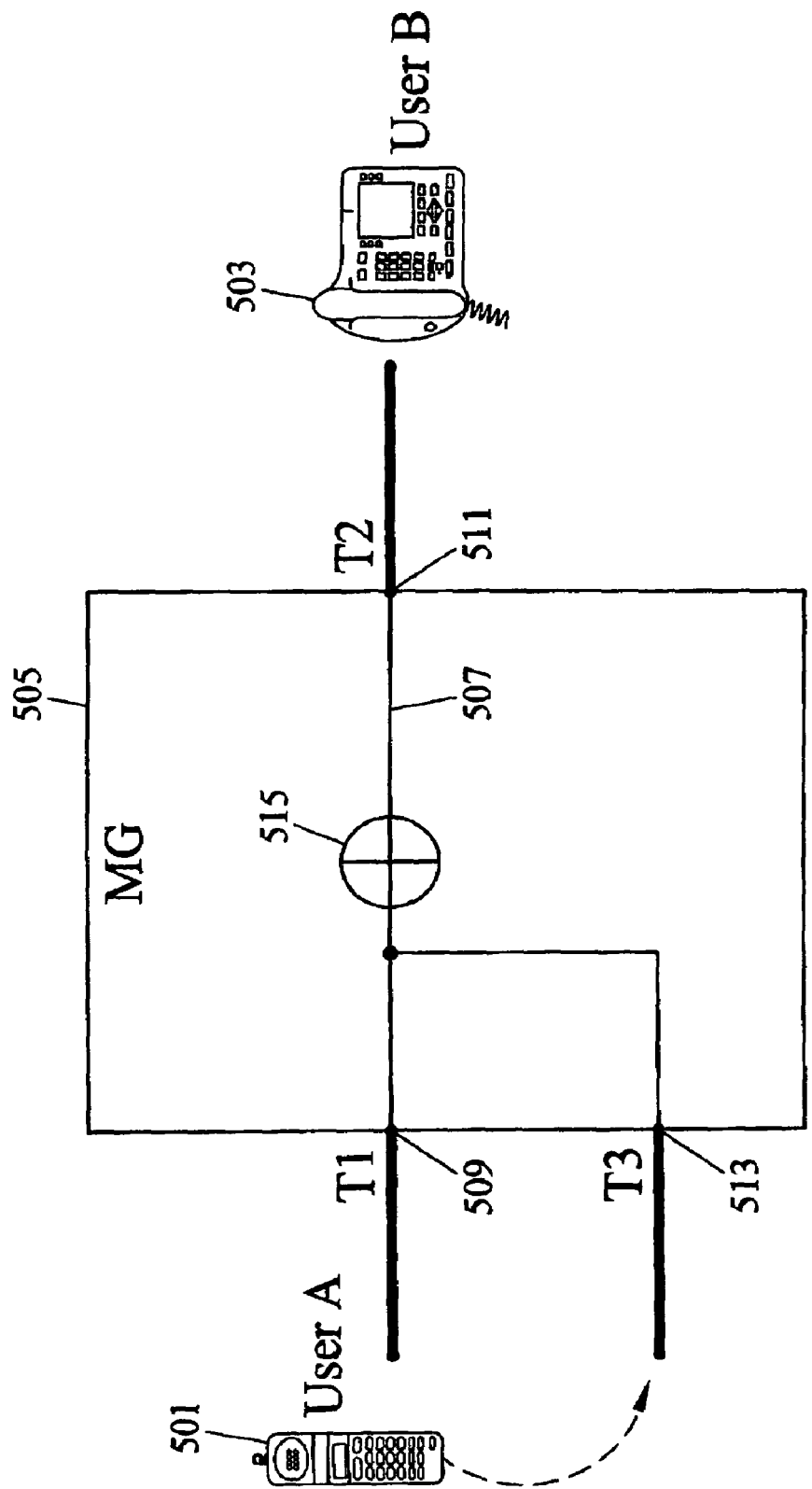
FIG. 5 is a block diagram of a handover scenario involving call handover within a single media gateway.

FIG. 5 is a block diagram of a call between User A 501 and User B 503. The call is established through the media gateway 505 by creating a context 507 that includes a media stream between termination T1 509 and termination T2 511. User A is connected to the media gateway 505 through termination T1 509. The connection may be, for example, through a wireless network, although the connection may be through any network that permits the user to change locations thereby requiring the media gateway to alter the media stream in order to maintain the call. User B 503 is connected to the media gateway 505 through termination T2 511. For this example, User B's connection may be either a wired or wireless connection. Termination T3 513 is similar to termination T1 509, although termination T3 513 is not initially involved in the call and is not initially part of the call context. A switching matrix 515 switches media streams between terminations in media gateway 515.

As User A 501 is moving outside of the area serviced by termination T1 509, provisions must be made to maintain the call connection to User B 503. In accordance with the invention, the call context is modified to create a termination pair. The creation of the termination pair involves adding termination T3 513 to the call context, designating termination T3 513 as a secondary termination, and modifying the call context to designate termination T1 509 as a primary termination. Thus, the bidirectional media stream between termination T1 509 and termination T2 511 remains, while a receive-only media stream from termination T2 511 to termination T3 513 is established.

The handover operation from termination T1 509 to termination T3 513 can be completed in two ways. First, the call context can be modified to designate termination T3 513 as the primary termination and termination T1 509 as the secondary termination. Thus, the bidirectional media stream is established between termination T3 513 and termination T2 511. Termination T1 509 is preferably removed to release gateway resources. The second way to complete the handover operation is to subtract primary termination T1 509 from the call context. Since termination T1 509 is paired with termination T3 513, subtracting the primary termination implicitly modifies the remaining paired termination to function as a normal termination with a bi-directional media stream.

EXAMPLE 2

Figure 6:
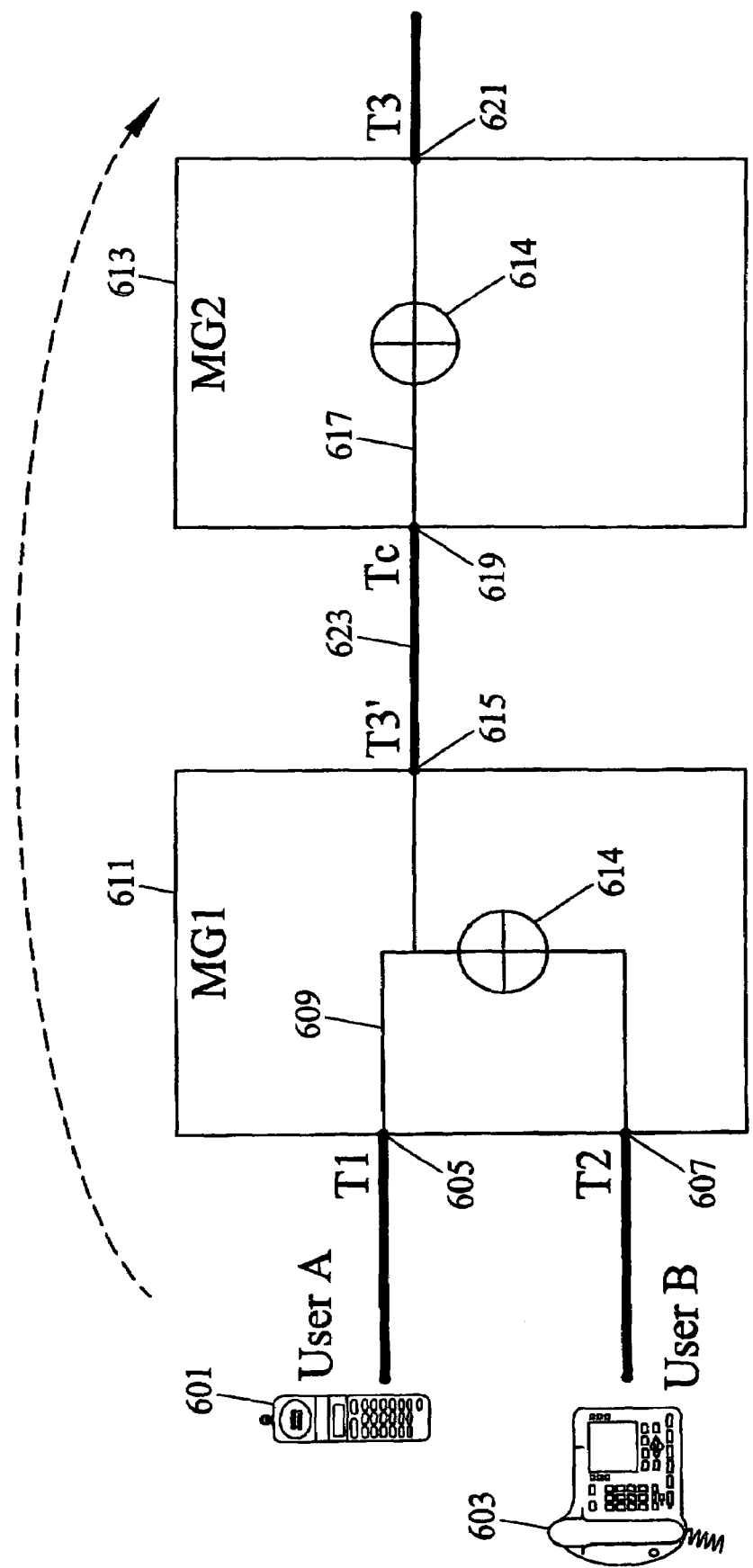
FIG. 6 is a block diagram of a handover scenario involving call handover from one media gateway and a second media gateway resulting in the addition of the second media gateway to the connection path.

FIG. 6 is a block diagram of a handover scenario involving call handover from one media gateway to another media gateway. As in the previous example, User A 601 is engaged in a call with User B 603. User A is serviced by termination T1 605, and User B is serviced by termination T2 607. Both termination T1 605 and termination T2 607 are associated with a call context 609 within media gateway MG1 611.

In this example, User A 601 is moving outside of the area serviced by media gateway MG1 611 to an area serviced by media gateway MG2 613. Each media gateway includes a switching matrix 614 to switch media streams between terminations. In order to maintain the call between User A 601 and User B 603, an association must be established between termination T3 621 in media gateway MG2 613 and termination T2 607 in media gateway MG1 611. As in the previous example and in accordance with the invention, the call context in media gateway MG1 611 is modified to create a termination pair. The creation of the termination pair involves adding termination T3' 615 to the call context in media gateway MG1 611, designating termination T3' 615 as a secondary termination, and modifying the call context to designate termination T1 605 as a primary termination. In media gateway MG2 613, a call context 617 is established between termination Tc 619 and termination T3 621. In a communication network, bearer channels interconnect media gateways. Thus, a connection between termination T3' 615 in media gateway MG1 611 and termination Tc 619 in media gateway MG2 613 is established in the conventional manner via a bearer channel 623.

After the end-to-end communication path is established, the media gateway controller may switch the role of termination T1 605 and termination T3' 615 in media gateway MG1 611. Thus, the call context in media gateway MG1 611 is modified to designate termination T3' 615 as the primary termination and termination T1 605 as the secondary termination. Termination T1 605 can then be removed from the call context to free network resources.

EXAMPLE 3

Figure 7A:
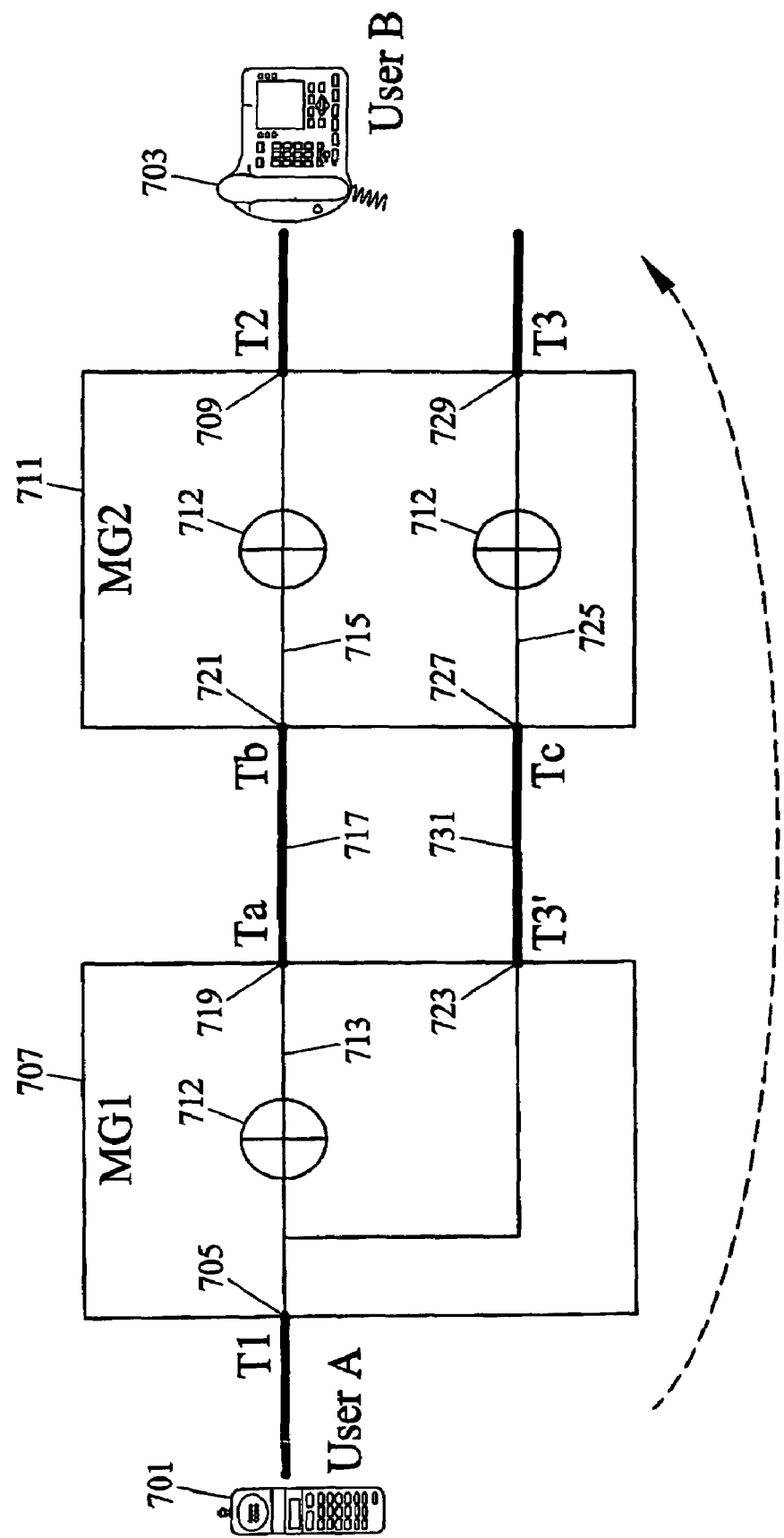
FIGS. 7A and 7B are block diagrams of a handover scenario involving call handover between a first media gateway and a second media gateway.

FIG. 7A is a block diagram of a handover scenario involving call handover from one media gateway and to another media gateway. As in the previous examples, User A 701 is engaged in a call with User B 703. User A 701 is serviced by termination T1 705 in media gateway MG1 707, and User B 703 is serviced by termination T2 709 in media gateway MG2 711. The media stream associated with the call context 713 in media gateway MG1 707 and call context 715 in media gateway MG2 is carried by a bearer channel 717 between termination Ta 719 and termination Tb 721.

In this example, User A 701 moves outside of the area serviced by media gateway MG1 707 and into an area serviced by media gateway MG2 711. It is assumed that each media gateway includes a switching matrix 712 to switch media streams between terminations. In order to maintain the call between User A 701 and User B 703, an association must be established between termination T3 729 in media gateway MG2 711 and termination T2 709 in media gateway MG2 711. As in the previous examples and in accordance with the invention, the call context in media gateway MG1 701 is modified to create a termination pair. The creation of the termination pair involves adding termination T3' 723 to the call context in media gateway MG1 707, designating termination T3' 723 as a secondary termination, and modifying the call context to designate termination T1 705 as a primary termination. In media gateway MG2 711, a call context 725 is established between termination Tc 727 and termination T3 729. A connection between termination T3' 723 in media gateway MG1 707 and termination Tc 727 in media gateway MG2 711 is established in the conventional manner using a bearer channel 731.

After the end-to-end communication path is established, the media gateway controller may switch the role of termination T1 705 and termination T3' 723 in media gateway MG1 707. Thus, the call context in media gateway MG1 is modified to designate termination T3' 723 as the primary termination and termination T1 705 as the secondary termination. Termination T1 705 can then be removed from the call context to free network resources.

EXAMPLE 4

Figure 7B:
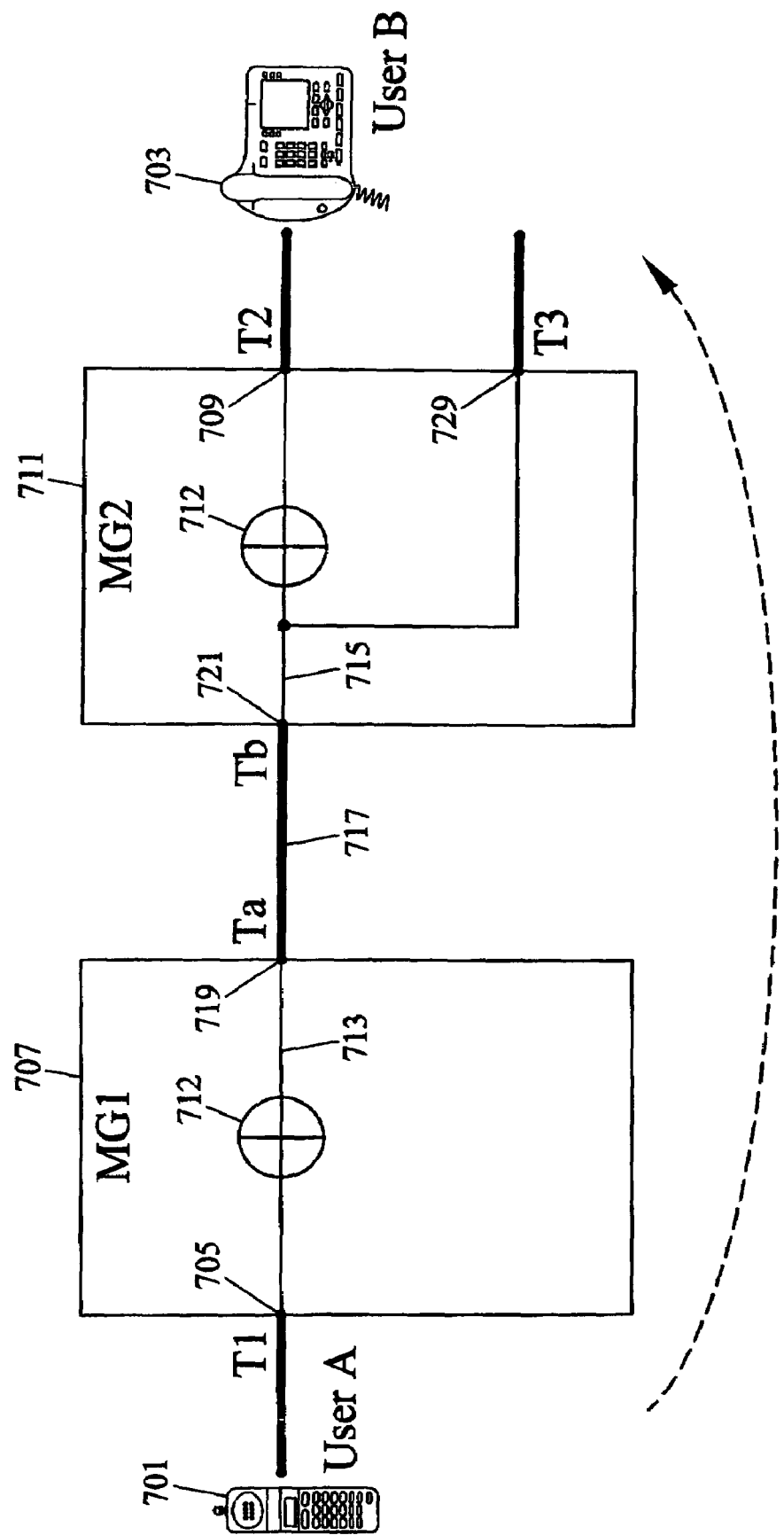

The solution provided in Example 3 results in the continued involvement of media gateway MG1 701 in a call between two users serviced by media gateway MG2 711. This solution may not be practical in some situations, such as when resource usage should be optimized. FIG. 7B is a block diagram of an alternate solution to a handover scenario involving call handover between one media gateway and a second media gateway. In this example, termination T1 705 in media gateway MG1 707 supports User A 701 and termination T2 709 in media gateway MG2 711 supports User B 703. A bearer channel 717 between termination Ta 719 and termination Tb 721 carries the media stream between the two media gateways. As User A 701 moves into an area serviced by media gateway MG2 711, the handover procedure is initiated. In this example, termination T3 729 is added to the call context 715 in media gateway MG2, with termination Tb 721 and termination T3 729 forming a termination pair. The call context 713 in media gateway MG1 707 remains unchanged. Termination Tb 721 is configured as the primary termination and termination T3 729 is configured as the secondary termination. As in the previous examples, termination Tb 721 and termination T3 729 switch roles and termination Tb is subtracted from the call context. As a result, the call context in media gateway MG2 provides a media stream between termination T2 709 and termination T3 703, and resources in media gateway MG1 707 are made available.

EXAMPLE 5

Figure 8:
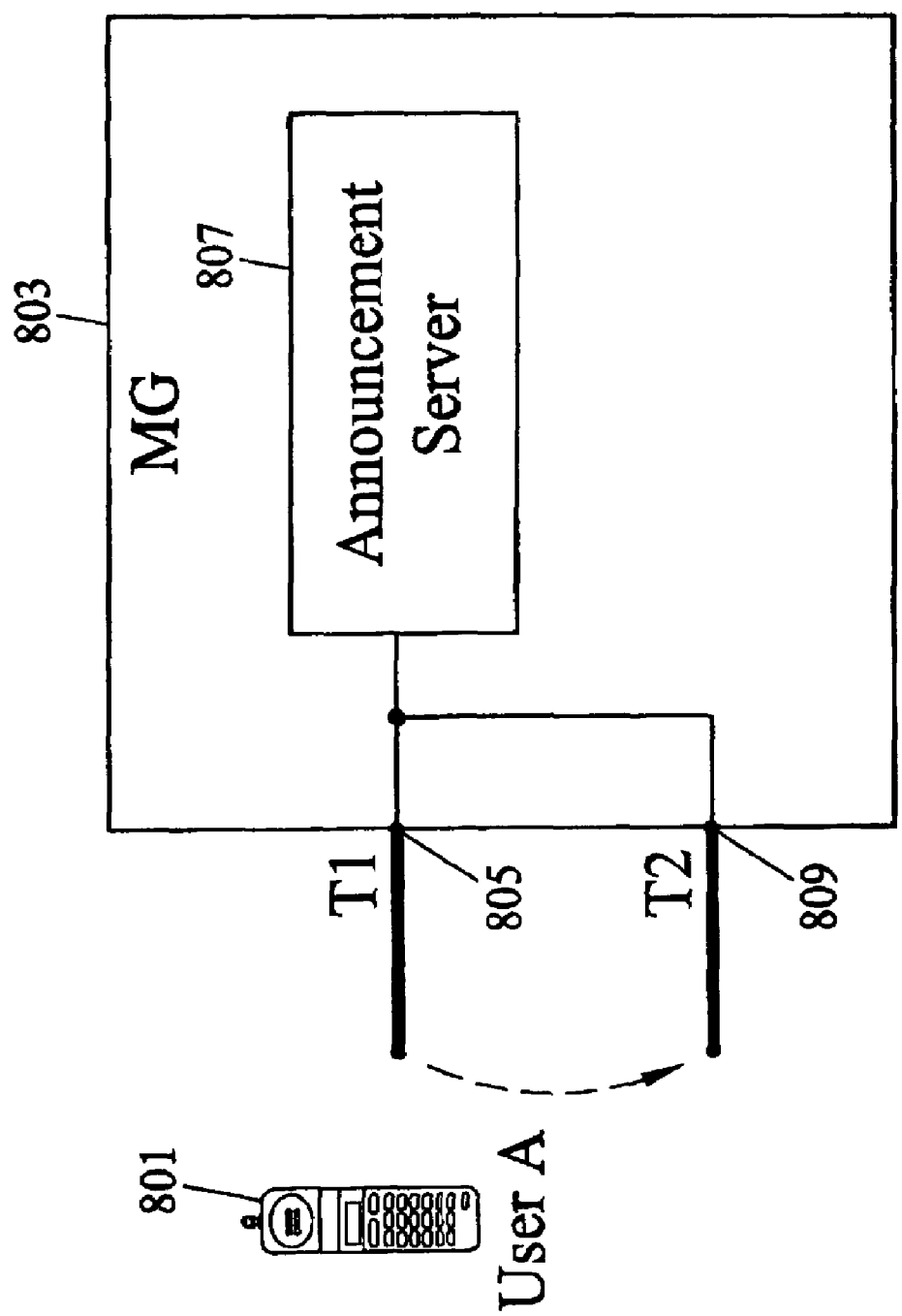
FIG. 8 is a block diagram of a handover scenario in a media gateway where a handover is initiated before a call is established according to an embodiment of the present invention.

The previous examples involve situations where call handover is initiated after a call has been established between User A and User B. FIG. 8 depicts the situation where call handover is initiated before the call has been established or when it is not possible for a call to be established between User A and User B. User A 801 is connected to media gateway 803 through termination T1 805. User A 801 may wish to establish a connection with User B (not shown) in a conventional manner, such as by dialing the telephone number assigned to User B. If the media gateway 803 is unable to establish the connection to User B, the media gateway 803 may signal this condition to User A 801 by transmitting a busy signal or other message toward User A 801. In this case, the media gateway 803 has established a context that includes only termination T1 805. The busy tone or announcement generated by the media gateway 803 and received by User A 801 is generated in a conventional manner by an announcement server 807 located within the media gateway 803.

As in the previous examples, User A 801 begins to move outside of the area served by termination T1 805. Provisions must be made to maintain the connection to User A 801 so that User A 801 can continue to receive the busy signal or announcement message. In accordance with the invention termination T2 809 is added to the context paired with termination T1 805, and designated as the secondary termination. The context is also modified to designate termination T1 805 as the primary termination. Because User A 801 is only receiving information from the media gateway, the media stream directed toward User A may be a one-way media stream. In this case, both the primary termination and the secondary termination may be configured as receive-only terminations. Thus, modification of the direction of either media stream may not be necessary. Handover can be completed by removing termination T1 805 from the context and leaving termination T2 807 as the only termination in the context.

It should be appreciated that handover involving a single user in the context may occur at any point during the establishment of a call. For example, User A 801 may move from the area served by termination T1 805 to the area served by termination T2 807 after User A 801 has finished dialing a phone number but before a connection has been established. In this case, the media gateway 803 may be transmitting ring-back tones toward User A 801 to indicate that call establishment is proceeding.

Thus, the present invention includes methods and systems for providing handover support in a media gateway. The methods and systems include the concept of termination pairing whereby a new termination can be created and paired with an existing termination for handover purposes. In accordance with one exemplary new handover implementation, the new termination added to the context is initially receive-only. After the new termination is established, the media gateway controller may reverse the roles of the new termination and the termination involved in the handover such that the new termination becomes send and receive and the termination involved in the handover event becomes receive-only. The termination involved in the handover event is then removed from the context. Thus, by providing the ability to pair terminations with existing terminations, the present invention provides a method for media stream handover in a media gateway without requiring the use of a conference bridge.

The invention has been described with respect to exemplary embodiments and examples, which are intended to be illustrative, not restrictive. In light of this disclosure, those skilled in the art will likely make alternate embodiments of this invention. These and other alternate embodiments are intended to fall within the scope of the claims that follow.

What is claimed is:

1. A method for providing media stream handover in a media gateway, the method comprising:
   (a) establishing a context between a first termination and a second termination in one or more media gateways, the first and second terminations being capable of bi-directional media stream communications associated with a call between first and second end users;
   (b) in response to initiation of a handover event affecting the first termination, adding a third termination to the context, the third termination being capable of receive-only communications in the call, wherein adding the third termination includes pairing the third termination with the first termination;
   (c) modifying the context such that the third termination becomes capable of bi-directional media stream communications in the call and the first termination becomes capable of receive-only communications in the call.

2. The method of claim 1 wherein pairing the third termination with the first termination includes sending a command from a media gateway controller to the media gateway for pairing the third termination with the first termination.

3. The method of claim 1 wherein modifying the context includes sending a command from a media gateway controller to the media gateway instructing the media gateway to switch the third termination to bi-directional media stream communications and the first termination to receive-only media stream communications.

4. The method of claim 1 wherein the call is a communication between packet-based communications terminals.

5. The method of claim 1 wherein the call is between a packet-based communications terminal and a TDM communications terminal.

6. The method of claim 1 wherein the call is between TDM communications terminals.

7. The method of claim 1 wherein steps (a)–(c) are performed without using a conference bridge.

8. The method of claim 1 wherein the first and second terminations are initialized in a first media gateway, wherein the first end user moves between areas associated with the first media gateway and wherein the third termination is initialized in the first media gateway.

9. The method of claim 1 wherein the first and second terminations are initialized in a first media gateway, wherein the first end user moves to an area served by a second media gateway, and wherein the third termination is initialized in the first media gateway to allow communications between the first and second end users via the first and second media gateways.

10. The method of claim 1 wherein the first termination is initialized in a first media gateway, wherein the second termination is initialized in a second media gateway, wherein the first end user moves to an area served by the second media gateway, and wherein the third termination is initialized in the second media gateway for bi-directional communications between the end users via the first and second media gateways.

11. The method of claim 1 wherein the first termination is initialized in a first media gateway and the second termination is initialized in a second media gateway, wherein the first end user moves to an area served by the second media gateway, and wherein the third termination is initialized in the second media gateway to enable bi-directional communications with the second termination through the second media gateway.

12. The method according to claim 1, further comprising removing the first termination from the context, thereby releasing resources associated with the first termination.

13. A media gateway with improved handover support, the media gateway comprising:
   (a) a plurality of network interfaces for sending and receiving media streams to and from external networks;
   (b) a plurality of voice processing resources operatively associated with the network interfaces for processing the media streams received from the external networks; and
   (c) a controller operatively associated with the network interfaces and the voice processing resources for controlling the network interfaces and the voice processing resources to establish a context in the media gateway for a call between first and second end users, the context including first and second terminations and for carrying media stream communications between the first and second terminations in the media gateway, and, in response to a handover event associated with the call, for adding a third termination to the context, pairing the third termination with the first termination, and switching the media stream communications between the first and second end users to proceed through the media gateway between the second and third terminations using the first context.

14. The media gateway of claim 13 wherein the network interfaces include packet network interfaces for sending and receiving packetized media stream.

15. The media gateway of claim 13 wherein the network interfaces include TDM network interfaces for sending and receiving TDM-encoded media stream.

16. The media gateway of claim 13 wherein the network interfaces include packet interfaces for sending and receiving packetized media stream and TDM interfaces for sending and receiving TDM-encoded media stream.

17. The media gateway of claim 13 wherein the controller is adapted to create the third termination in response to commands from a media gateway controller.

18. The media gateway of claim 13 wherein the controller is adapted to create the third termination and perform the switching between the first and third terminations without using a conference bridge.

19. The media gateway of claim 13 wherein the controller is adapted to pair the first termination with the third termination.

20. A media gateway with improved handover support, the media gateway comprising:
   (a) a plurality of network interfaces for sending and receiving media streams to and from external networks;
   (b) a plurality of voice processing resources operatively associated with the network interfaces for processing the media streams received from the external networks; and
   (c) a controller operatively associated with the network interfaces and the voice processing resources for controlling the network interfaces and the voice processing resources to establish a context in the media gateway for a call between first and second end users, the context including first and second terminations, and, in response to a handover event associated with the call, for adding a third termination to the context, pairing the third termination with the first termination, and switching communications between the first and second end users to proceed between the second and third terminations, wherein the controller is adapted to initialize the third termination for receive-only communications, to switch the third termination from receive-only communications to send and receive communications, and to switch the first termination to receive-only communications.

21. The media gateway of claim 20 wherein the controller is adapted to remove the first termination from the context after switching the first termination to receive-only communications.

22. A system for controlling handovers between terminations in one or more media gateways, the system comprising:
 (a) a media gateway controller for generating media gateway control commands for establishing contexts through media gateways for calls between first and second end users that use the media gateways; and
 (b) at least one media gateway operatively associated with the media gateway controller for, in response to the commands from the media gateway controller, establishing a first context for a call between first and second end users, the first context including first and second terminations being initialized for bi-directional communications, for pairing a third termination with one of the first and second terminations in response to a handover event, the third termination being initialized for receive-only communications, and for switching the first termination to receive-only communications and the third termination to bi-directional communications and thereby performing a media stream handover in response to the handover event.

23. The system of claim 22 wherein the media gateway controller is adapted to control the media gateway to perform the media stream handover using extensions to a media gateway control protocol.

24. The system of claim 23 wherein the extensions include a command for pairing a termination with an existing context.

25. The system of claim 23 wherein the commands include a command for switching a context from bi-directional communications to receive-only communications and vice versa.

26. The system of claim 22 wherein the at least one media gateway includes a first media gateway, the first and second terminations are initialized in the first media gateway, wherein, in response to the first end user moving to an area served by the first media gateway, the media gateway controller is adapted to initialize the third termination in the first media gateway.

27. The system of claim 22 wherein the at least one media gateway includes first and second media gateways, wherein the first and second terminations are initialized in the first media gateway, wherein, responsive to the first end user moving to an area served by the second media gateway, the media gateway controller is adapted to initialize the third termination in the first media gateway for bi-directional communications between the first and second media gateways.

28. The system of claim 22 wherein the at least one media gateway includes first and second media gateways, wherein the first termination is initialized in the first media gateway, wherein the second termination is initialized in the second media gateway, wherein, responsive to the first end user moving to an area served by the second media gateway, the media gateway controller is adapted to initialize the third termination in the second media gateway.

29. The system of claim 22 wherein the at least one media gateway includes first and second media gateways, wherein the first termination is initialized in the first media gateway, wherein the second termination is initialized in the second media gateway, and wherein, responsive to the first end user moving to an area served by the second media gateway, the media gateway controller is adapted to initialize the third termination in the second media gateway for bi-directional communications between the first and second end users via the second media gateway.

30. The system of claim 22 wherein the at least one media gateway is adapted to complete the media stream handover without using a conference bridge.

31. The system of claim 22 wherein the at least one media gateway includes packet interfaces for sending and receiving packetized media stream communications.

32. The system of claim 22 wherein the at least one media gateway includes TDM interfaces for sending and receiving TDM-encoded media information.

33. The system of claim 22 wherein the media gateway includes packet interfaces for sending and receiving packetized media streams and TDM interfaces for sending and receiving TDM-encoded media streams.

34. The system of claim 22 wherein the media gateway controller and the at least one media gateway are located on the same physical platform.

35. The system of claim 22 wherein the media gateway controller and the at least one media gateway are located on separate physical platforms.

36. A method for providing media stream handover support in a media gateway, the method comprising:
 in a media gateway:
 (a) establishing a context having a first termination, the context comprising a media stream connection for carrying media communications between the first termination and an announcement server within the media gateway; and
 (b) in response to initiation of a handover event affecting the first termination, adding a second termination to the context, wherein adding the second termination includes pairing the second termination with the first termination so that the media communications between the second termination and the announcement server can proceed through the media gateway using the first context.

37. The method of claim 36 wherein pairing the second termination with the first termination includes sending a command from a media gateway controller to the media gateway for pairing the second termination with the first termination.

38. The method of claim 36 wherein the first and second terminations are capable of receiving at least one of tones and announcements from an announcement server within the media gateway.

39. The method of claim 36 wherein steps (a) and (b) are performed without using a conference bridge.

40. The method according to claim 36, further comprising removing the first termination from the context, thereby releasing resources associated with the first termination.

* * * * *